(12) United States Patent
Heymann et al.

(10) Patent No.: US 7,296,052 B2
(45) Date of Patent: Nov. 13, 2007

(54) AUTOMATICALLY SELECTING APPLICATION SERVICES FOR COMMUNICATING DATA

(75) Inventors: Jürgen Heymann, Heidelberg (DE); Stefan Kusterer, Nussloch (DE); Bernhard Drittler, Walldort (DE)

(73) Assignee: SAP AG, Walldorf (DE)

( * ) Notice: Subject to any disclaimer, the term of this patent is extended or adjusted under 35 U.S.C. 154(b) by 736 days.

(21) Appl. No.: 10/286,340

(22) Filed: Nov. 1, 2002

(65) Prior Publication Data

US 2003/0167299 A1    Sep. 4, 2003

(51) Int. Cl.
G06F 15/16    (2006.01)
G06F 15/173    (2006.01)

(52) U.S. Cl. .................... 709/203; 709/223
(58) Field of Classification Search ........... 709/203, 709/217, 219, 223
See application file for complete search history.

(56) References Cited

U.S. PATENT DOCUMENTS

| | | | | |
|---|---|---|---|---|
| 5,913,208 | A * | 6/1999 | Brown et al. .................. | 707/3 |
| 6,167,441 | A * | 12/2000 | Himmel ....................... | 709/217 |
| 6,748,439 | B1 * | 6/2004 | Monachello et al. ........ | 709/229 |
| 6,892,309 | B2 * | 5/2005 | Richmond et al. ........... | 726/7 |
| 2002/0174097 | A1 * | 11/2002 | Rusch et al. ................. | 707/1 |
| 2003/0154380 | A1 * | 8/2003 | Richmond et al. .......... | 713/182 |

FOREIGN PATENT DOCUMENTS

| | | | |
|---|---|---|---|
| DE | 001244008 A1 * | 3/2001 | |
| DE | 100 55 684 A1 | 5/2001 | |
| WO | WO99/09658 | 2/1999 | |
| WO | WO 01/24045 A2 | 4/2001 | |

OTHER PUBLICATIONS

Graf, P., "The Software Works the Way I Do", SAP INFO, SAP, No. 59, May 1999, pp. 24-25, XP002255821.

* cited by examiner

*Primary Examiner*—Jason Cardone
*Assistant Examiner*—Minh-Chau Nguyen
(74) *Attorney, Agent, or Firm*—Fountainhead Law Group P.C.

(57) ABSTRACT

A client computer and a server computer communicate via a network; the server computer receives user identification via the client computer that is selectively a first device or a second device. The server computer stores at least first and second application services for a single predetermined application class, wherein the first and second application services are adapted to client computer type. Upon receiving user identification, the server computer further receives a device attribute from the client computer, compares the device attribute with reference attributes, and selectively sends a representation of the first application service or of the second application service to the client computer according to the device attribute.

17 Claims, 3 Drawing Sheets

TABLE 100

TABLE 110

| APPLICATION CLASS 200 | REFERENCE ATTRIBUTES 401,402 | POINTERS TO APPLICATION SERVICES 201',202' |
|---|---|---|
| "MARKET SHARE" | "AD" ←→ 401 | "DISPLAY ALPHANUMERIC DATA" 201' |
| "MARKET SHARE" | "AGD" ←→ 402 | "DISPLAY ALPHANUMERIC AND GRAPHIC DATA" 202' |
| ... | ... | ... |
| ... | ... | ... |

FIG. 2

TABLE 120

| REFERENCE USER IDENTIFICATION 1001 | ROLE 140 |
|---|---|
| USER 1 ←→ | ROLE 1<br>ROLE 2 |
| USER 2 ←→ | ROLE 1<br>ROLE 3 |
| USER 3 ←→ | ROLE 2<br>ROLE 3 |

TABLE 130

| ROLE 140 | APPLICATION CLASS 200 |
|---|---|
| ROLE 1 ←→ | "MARKET SHARE" |
| ROLE 2 ←→ | "..." |
| ROLE 3 ←→ | "..." |

FIG. 3

AUTOMATICALLY SELECTING APPLICATION SERVICES FOR COMMUNICATING DATA

TECHNICAL FIELD

This invention relates to automatically selecting application services for communicating data from a server system to a client system.

BACKGROUND

Client/server describes a relationship between two computer programs in which one program, the client, makes a service request from another program, the server, which fulfills the request. Although programs within a single computer can use the client/server model, it is a more important idea in a network. In a network, the client/server model provides a convenient way to interconnect programs that are distributed efficiently across different locations.

The client/server model has become one of the central ideas of network computing. Most business applications being written today use the client/server model. In the usual client/server model, one server, sometimes called a daemon, is activated and awaits client requests. Typically, multiple client programs share the services of a common server program. Both client programs and server programs are often part of a larger program or application. For example, a web browser such as Netscape Navigator or Microsoft Internet Explorer is a client program that requests services (the sending of Web pages or files) from a Web server in another computer somewhere on the Internet.

In a distributed network, users interact with front-end computers to call application services from a remote computer. Usually, both front-end computers and remote computers are client-server related, with the front-end computer being the client computer and the remote computer being the server computer.

While the server computer often requires a user interface for administrative functions, such a user interface is more crucial for the user of the front-end computer. Front-end computers can be implemented by a variety of devices, such as, desktop computers, notebook computers, palm size computers, and mobile phones. The user may switch between these devices, but the data from the server computer might fit device properties of different front-end computers only partly or might not fit at all.

SUMMARY

In an aspect, the invention features a method including maintaining in a server for a single predetermined application class, and for at least a first device and a second device, at least a first application service and a second application service, maintaining in the server a first assignment, wherein in the first assignment reference attributes are assigned to application services, maintaining in the server a second assignment, wherein in the second assignment reference user identifications are assigned to roles, maintaining in the server a third assignment, wherein in the third assignment application classes are assigned to roles, receiving in the server over a network a user identification from a client, receiving a device attribute from the client, selecting the role and the application class according to the second and third assignments and the user identification, and selecting the application service according to the selected application class, the device attribute, and the first assignment, and sending a representation of the selected application service from the server to the client.

The invention can be implemented to include one or more of the following advantageous features. In embodiments, the method can include selectively executing the application service for the representation has been sent. Executing can be in response to receiving a service request from the client.

The first and second application services can provide different data for different visual presentations in the client. The method can be characterized by receiving the device attribute through evaluating of physical signal transfer parameters in the network.

In another aspect, the invention features a client/server method including maintaining in a server system at least a first application service and a second application service for a single predetermined application class and a client system, the client system being a first device or a second device, maintaining in the server system a first assignment store, the first assignment store relating reference attributes to application services, maintaining in the server system a second assignment store, the second assignment store relating user identifications to roles, maintaining in the server system a third assignment store, the third assignment store relating application classes to the roles, receiving a user identification and device attribute from the client system, selecting a role and the application class from the second assignment store and the third assignment store, selecting the application service from the first assignment store, and sending a representation of the selected application service to the client system.

The invention can be implemented to include one or more of the following advantageous features.

The method can also include executing the selected application service in the server system. Executing can be in response to receiving a service request from the client system. The received device attribute can be represented by a tag attached to a message that the client system communicates to the server system, and the message can be a unified resource locator (URL).

In embodiments, the first and second application services provide different data for different visual presentations in the client system depending on the device of the client system. The device attribute can describe properties of an output device of the client system. The device attribute can be a type identifier of the client system.

The invention can be implemented to realize one or more of the following advantages.

The method relieves a client system user from specifying the device type and from selecting a device appropriate application service.

The method allows a server system to be prepared for different visualizations thus preventing data from being transferred that cannot be displayed on a client system device.

DESCRIPTION OF DRAWINGS

FIG. 2 is a block diagram of a process;

FIG. 3 is a block diagram of assignment tables; and

Like reference symbols in the various drawings indicate like elements.

DETAILED DESCRIPTION

Figure 1:
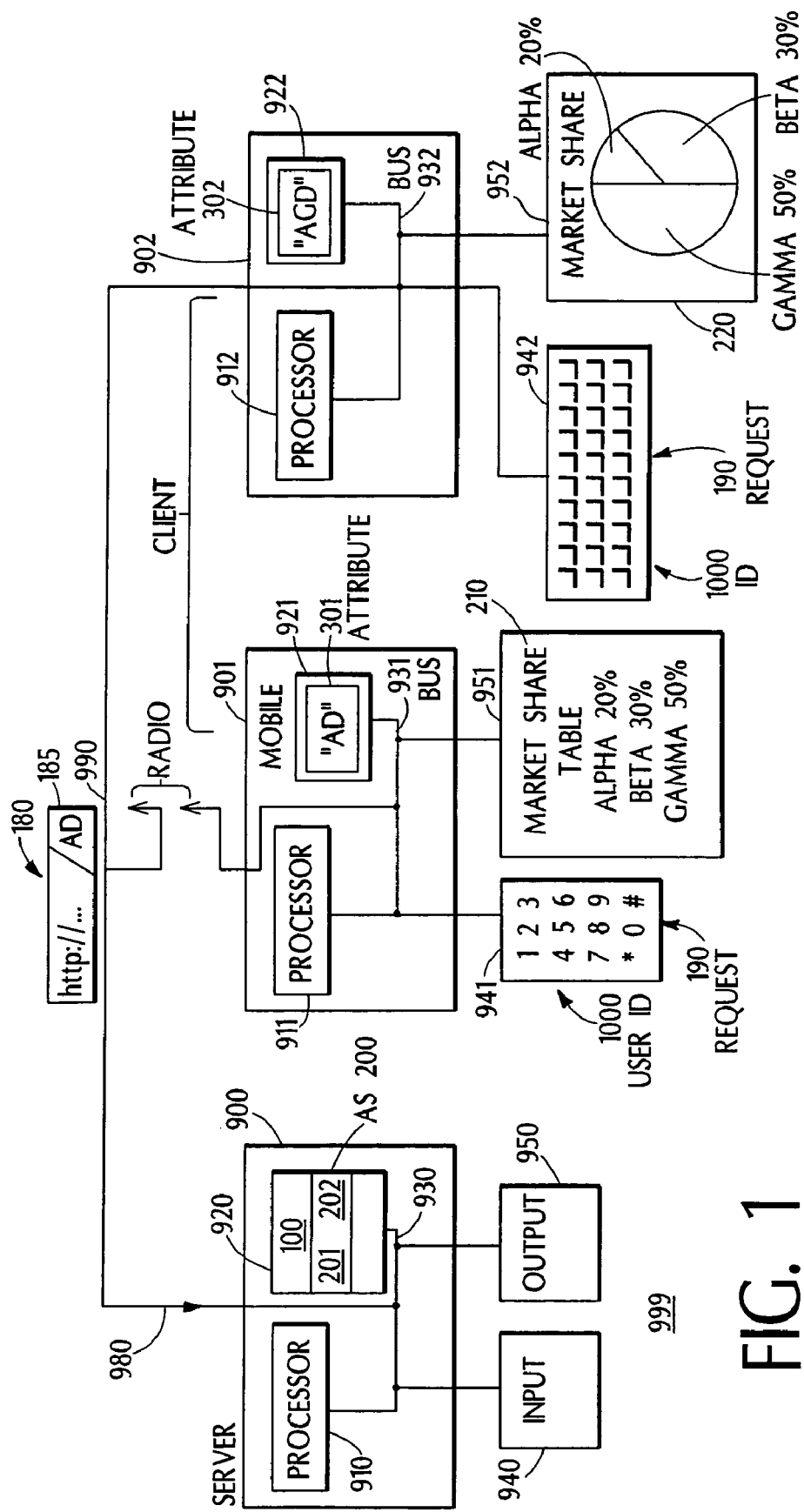
FIG. 1 is a block diagram of a network.

Referring to FIG. 1, a network 999 includes computers 900, 901, 902. Computers 900-902 are coupled via inter-computer network 990. Computer 900 includes processor 910, memory 920, bus 930, input device 940, and output device 950. The input device 940 and output device 950 are often collectively referred to a user interface. Memory 920 includes a process 100, fully described below.

In an example, computer 900 is a server adapted to communicate with client computers 901, 902 via network 990. Client system 901 is, for example, a mobile computer with phone keyboard 941 and LCD-display 951. Network 990 can also include a wireless link, such as a radio link. Client system 902 is, for example, a desktop computer with keyboard 942 and display 952.

As illustrated by arrow symbols, a user inputs user identification 1000 and optionally a service request 190. LCD-display 951 shows presentation 210, in the example, a table titled "MARKET SHARE" with "ALPHA 20%", "BETA 30%", and "GAMMA 50%". Display 952 shows presentation 220, the same data of presentation 210 "MARKET SHARE" in the form of a pie chart.

In server computer 900, memory 920 stores process 100 along with application services 201, 202. Application services 201, 202 belong to a single predetermined application class 200. Application services 201, 202 are provided to serve client computers 901, 902. In client computer 901 and client computer 902, memory 921 and memory 922 store device attribute 301 (e.g., alphanumeric device AD) and device attribute 302 (e.g., alphanumeric graphic device AGD), respectively. Device attributes 301, 302 describe properties of output devices 951, 952, respectively. Device attribute properties can also be represented by using a type identifier of client 901, 902 for device attribute 301, 302. For example, the type identifier can be any expression with letters and numbers that a manufacturer of client computer uses for marketing.

Upon receiving user identification 1000, server computer 900 receives device attribute 301, 302 from client 901, 902, and selectively sends a representation of application service 201, 202 to client systems 901, 902, according to device attribute 301, 302.

Application services 201, 202 provide different data for different visual presentations 210, 220 in client computer 901 and client computer 902, respectively. Choice of presentation depends on device type of client computer 901, 902. For example, LCD-display 951 has an "AD" attribute and presents alphanumeric symbols, while display 952 has "AGD" attribute and presents alphanumeric symbols and graphics.

Server computer 900 sends representations of application services 201, 202 after comparing device attributes 301, 302 with reference attributes. After receiving service request 190 from client computer 901, 902, server computer 900 can selectively execute application service 201 or 202. In this example, server computer 900 executes the application service by completing presentations 210, 220 with table and graphics, respectively.

Server computer 900 can receive device attributes 301, 302 through a tag 185 attached to a network message 180. Network message 180 can be, in one example, a Uniform Resource Locator (e.g., URL "http://. . . /AD" with tag "AD"). A Uniform Resource Locator (URL) is as address of a file (resource) accessible on the Internet. The type of resource depends on the Internet application protocol. Using the World Wide Web's protocol, the Hypertext Transfer Protocol (HTTP), the resource can be an HTML page, an image file, a program such as a common gateway interface application or Java applet, or any other file supported by HTTP. The URL contains the name of the protocol required to access the resource, a domain name that identifies a specific computer on the Internet, and a hierarchical description of a file location on the computer.

In other examples, server computer 900 monitors network 990 to receive device attributes 301, 302 by evaluating parameters in network 990. Example parameters are data transfer rate and speed.

Referring to FIG. 2, process 100 includes an assignment table 110. A first assignment is indicated by double-arrows. Reference attributes 401, 402 are selectively assigned to application service 201 or to application service 202, respectively. It is not required that application service 201, 202 reside in process 100; it is sufficient to provide pointers 201' and 202' in process 100. Hence, pointer 201' points to service 201 "DISPLAY ALPHANUMERIC DATA", and pointer 202' points to service 202 "DISPLAY ALPHANUMERIC AND GRAPHIC DATA". Table 110 also shows that applications services 201, 202 belong to the same application class 200.

Referring to FIG. 3, process 100 can include assignment tables 120 and 130. Assignments are again illustrated by double-arrows. In assignment table 120, reference user identification 1001 is assigned to role 140; in assignment table 130, application class 200 is assigned to role 140. Upon receiving user identification 1001, role 140 and application class 200 are selected according to the second and third assignments, respectively. In an example, three different users USER 1, USER 2, and USER 3 have ROLES 1 and 2, ROLES 1 and 3, and ROLES 2 and 3, respectively. When USER 1 or USER 2 logs on to either client computer 901 or client computer 902, both can use the application class "MARKET SHARE" in ROLE 1. The user who communicates via client computer 901 is served by application 201 (i.e., presentation 210); the user who communicates via client system 902 is served by application 202 (i.e., presentation 220).

Figure 4:
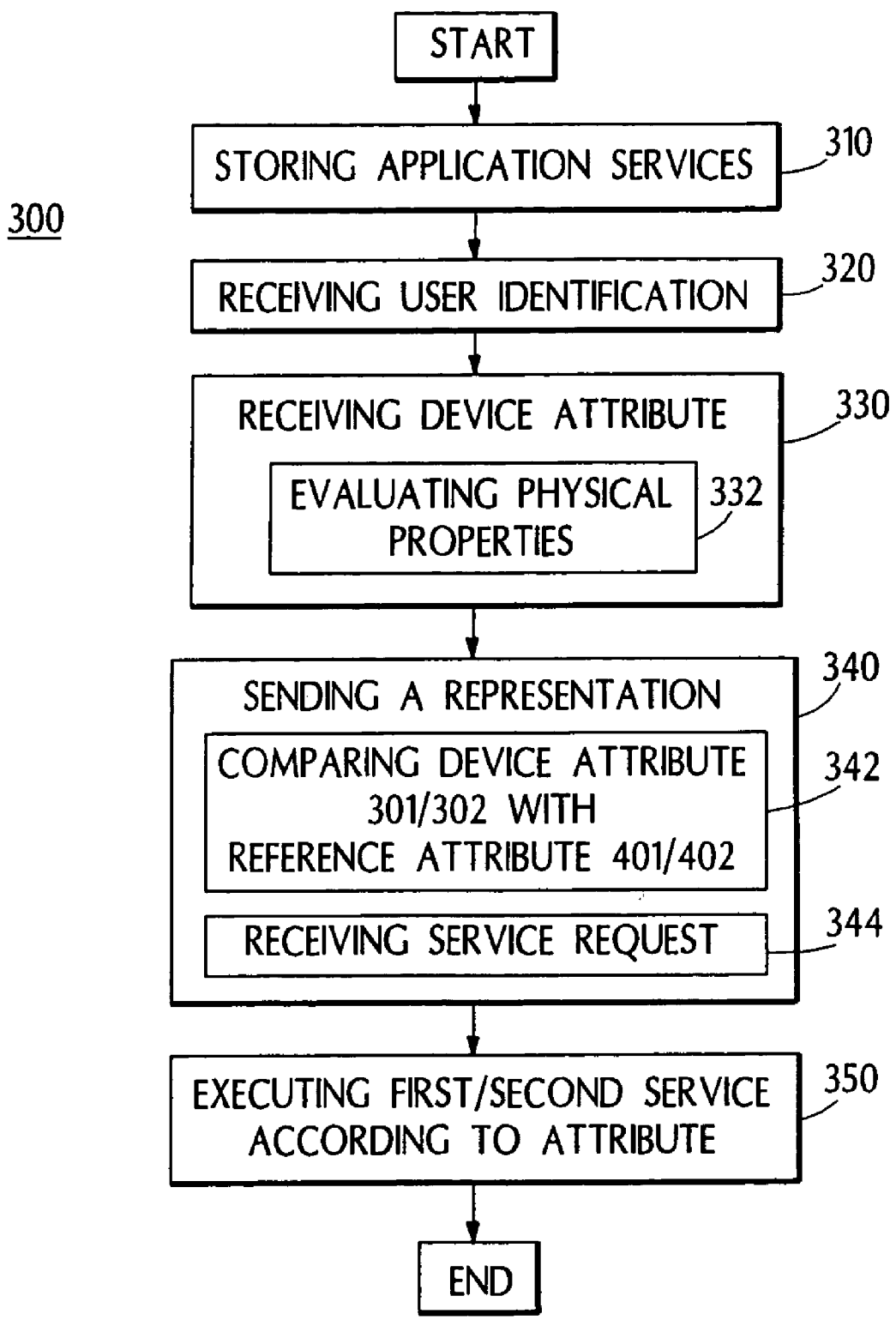
FIG. 4 is a flow diagram of a process.

Referring to FIG. 4, process 100 includes storing (310) application services, receiving (320) user identification, receiving (330) device attributes, sending (340) a representation and executing (350) a service according to the device attributes. Receiving (330) device attributes can include evaluating (332) physical properties. Sending (340) a representation can include comprising (342) device attributes with reference attributes and receiving (344) a service request.

For application class 200, and for client 901, 902, server 900 stores (310) at least first application service 201 and second application service 202.

Process 100 receives (320) user identification 1000 and receives (330) device attributes 301, 302 from client 901, 902. Process 100 selectively sends (340) a representation of first application service 201 or of second application service 202 to client 901, 902 according to device attribute 301, 302. Process 100 sends application services 201, 202 after comparing (342) device attribute 301, 302 with reference attributes 401 and 402. Process 100 selectively executes (350) application service 201, 202 after receiving service request 190 from client 901, 902. Process 100 can also receive (330) device attributes 301, 302 by evaluating (332) physical signal transfer parameters in network 990.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims.

What is claimed is:

1. A method comprising:
   maintaining in a server an application class, the application class having a plurality of application services;
   maintaining in the server a first assignment wherein device attributes are assigned to application services;
   maintaining in the server a second assignment wherein user identifications assigned to roles;
   maintaining in the server a third assignment wherein roles are assigned to application classes;
   receiving in the server over a network a client user identification from a client;
   automatically selecting a role according to the second assignment and the client user identification;
   automatically selecting the application class according to the third assignment and the selected role, the selection of the application class identifying the plurality of application services;
   receiving a client device attribute from the client;
   automatically selecting an application service from the identified plurality of application services according to the first assignment and the client device attribute; and
   sending a representation of the selected application service from the server to the client.

2. The method of claim 1 further comprising selectively executing the application service for the representation.

3. The method of claim 2 wherein executing is in response to receiving a service request from the client.

4. The method of claim 1 wherein the first and second application services provide different data for different visual presentations in the client.

5. The method of claim 1 characterized by receiving the device attribute through evaluating of physical signal transfer parameters in the network.

6. A method comprising:
   maintaining in a server system a plurality of application services for a single predetermined application class and a client system, the client system being a device from a plurality of devices, each device in the plurality of devices having respective device attributes;
   maintaining in the server system a first assignment store, the first assignment store relating device attributes to application services;
   maintaining in the server system a second assignment store, the second assignment store relating user identifications to roles;
   maintaining in the server system a third assignment store, the third assignment store relating roles to application classes;
   receiving a client user identification from the client system;
   automatically selecting a role according to the second assignment store and the client user identification;
   automatically selecting the application class according to the second assignment store and the selected role, the selection of the application class identifying the plurality of application services;
   receiving a client device attribute from the client system;
   automatically selecting an application service from the identified plurality of application services according to the first store and the client device attribute; and
   sending a representation of the selected application service to the client system.

7. The method of claim 6 further comprising executing the selected application service in the server system.

8. The method of claim 7 wherein executing is in response to receiving a service request from the client system.

9. The method of claim 6 in which the received device attribute is represented by a tag attached to a message that the client system communicates to the server system.

10. The of claim 9 wherein the message is a unified resource locator (URL).

11. The method of claim 6 wherein the first and second application services provide different data for different visual presentations in the client system depending on the device of the client system.

12. The method of claim 6 wherein the device attribute describes properties of an output device of the client system.

13. The method of claim 12 wherein the device attribute is a type identifier of the client system.

14. A computer program product, tangibly embodied on a machine-readable storage device, for selecting application services in a server according to device attributes of a client, the product comprising instructions operable to cause a processor to:
   maintain in a server an application class, the application class having a plurality of application services;
   maintain in the server a first assignment wherein device attributes are assigned to application services;
   maintain in the server a second assignment wherein user identifications are assigned to roles;

maintain in the server a third assignment, wherein roles are assigned to application classes;

receive in the server over a network a client user identification from a client;

automatically select a role according to the second assignment and the client user identification;

automatically select the application class according to the third assignment and the selected role, the selection of the application class identifying the plurality of application services;

receive a device attribute from the client;

automatically select an application service from the identified plurality of application services according to the first assignment and the client device attribute; and send a representation of the selected application service from the server to the client.

15. The product of claim 14 further comprising instructions to:

selectively execute the application service for the representation.

16. A computer program product, tangibly embodied on a machine-readable storage device, for selecting application services in a server system according to device attributes of a client system, the product comprising instructions operable to cause a processor to:

maintain in a server system a plurality of application services for a single predetermined application class and a client system, the client system being a device from a plurality of devices, each device in the plurality of devices having respective device attributes;

maintain in the server system a first assignment store, the first assignment store relating device attributes to application services;

maintain in the server system a second assignment store, the second assignment store relating user identifications to roles;

maintain in the server system a third assignment store, the third assignment store relating roles to application classes;

receive a client user identification from the client system;

automatically select a role according to the second assignment store and the client user identification;

automatically select the application class according to the second assignment store and the selected role, the selection of the application class identifying the plurality of application services;

receive a client device attribute from the client system;

automatically select an application service from the identified plurality of application services according to the first assignment store and the client device attribute; and send a respresentation of the selected application service to the client system.

17. The product of claim 16 further comprising instructions to:

execute the selected application service in the server system.

\* \* \* \* \*